United States Patent [19]

Kwiatkowski

[11] 3,862,129

[45] Jan. 21, 1975

[54] NOVEL HALOAROMATIC ETHERAMINES
[75] Inventor: George T. Kwiatkowski, Green Brook, N.J.
[73] Assignee: Union Carbide Corporation, New York, N.Y.
[22] Filed: Jan. 12, 1973
[21] Appl. No.: 322,984

[52] U.S. Cl....... 260/326.26, 260/2 EP, 260/326 N, 260/326.5 FM, 260/518 A, 260/570 R, 260/839
[51] Int. Cl............................................. C07d 27/18
[58] Field of Search.. 260/326 C, 326.26, 326.5 FM

[56] References Cited
UNITED STATES PATENTS
3,306,852  2/1967  Hendrickson............. 260/326.26 X Primary Examiner—Joseph A. Narcavage
Attorney, Agent, or Firm—Bernard Francis Crowe

[57] ABSTRACT

Novel haloaromatic etheramines have been synthesized from halogenated benzene and polyphenyls and alkali metal salts of phenol-formaldehyde-anilineresins. The resultant etheramines are epoxy curing agents and intermediates for the preparation of thermosetting imides.

9 Claims, No Drawings

NOVEL HALOAROMATIC ETHERAMINES

BACKGROUND OF THE INVENTION

This invention pertains to novel haloaromatic etheramines and their preparation from halogenated benzene and polyphenyls with phenol-formaldehydeaniline resins. It also pertains to thermosetting maleimides derived from the haloaromatic etheramines.

There is a continuing need in the polymer field for haloaromatic polyamines for use as epoxy curing agents, polyurethane load enhancing additives, flame retardants for such polymers as nylons and polyesters and as intermediates for further synthesis. Such polyamines should have high amine reactivity, high halogen contents on a per cent chlorine/amine equivalent basis and low cost.

SUMMARY OF THE INVENTION

A novel class of haloaromatic etheramines meeting the above criteria have been discovered having an idealized structure represented by the formula:

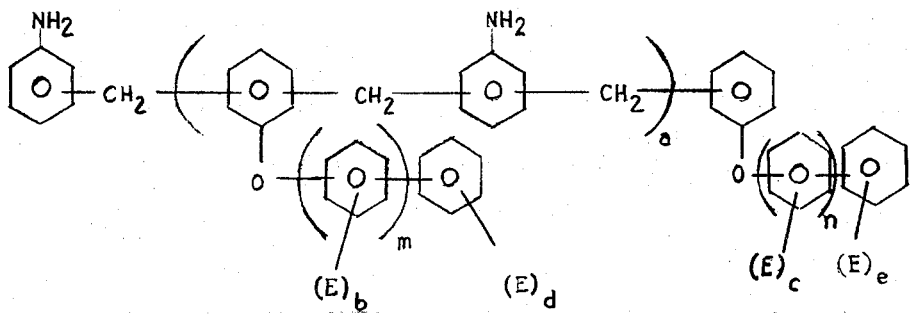

wherein
E is a halogen selected from the group consisting of fluorine, chlorine and bromine;
$a$ is an integer having average values of 0 to about 5;
$b$ and $c$ are each integers having values of 1 to 4;
$d$ and $e$ are each integers having values of 1 to 5; and
$m$ and $n$ are each integers having values of 1 to about 3.

These haloaromatic amines can be prepared by the following series of reactions:

1. charging a reactor with dimethyl sulfoxide, toluene and phenol-formaldehyde-aniline resin (PFAR);
2. adding an equivalent amount of 50% aqueous sodium hydroxide;
3. azeotropic distillation of the water formed;
4. addition of a solution of a halogenated benzene or polyphenyl in the azeotropic solvent followed by distillation of the azeotropic solvent; and
5. completion of the condensation reaction at about 140°–170°C.

Filtration of the salt, coagulation in water and washing with water affords the haloaromatic etheramines in yields of about 95%.

Dimethyl sulfoxide can be replaced by N-methylpyrrolidonone (NMP) in the condensation reaction. When this is done, the process is altered so that 50% aqueous NaOH is added to a refluxing solution of PFAR, NMP and an azeotropic solvent and the water removed concurrently with the addition. Under these conditions the halogenated polyphenyls can be charged with the PFAR. The use of NMP is more convenient when subsequent reactions are to be conducted.

The phenol-formaldehyde-aniline resin used in step (1) can be represented by the formula:

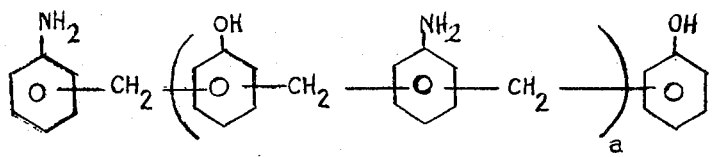

where $a$ is an integer having values of 0 to about 5. These phenol-formaldehyde-aniline resins can be prepared by the reaction of aqueous formaldehyde solution with phenol and aniline.

The preferred halogenated polyphenyls are multichlorinated polyphenyls such as the Aroclors (tradename of Monsanto Company). Commercially available Aroclors include Aroclor 1242 (42% chlorinated biphenyl), Aroclor 1254 (54% chlorinated biphenyl) and Aroclor 5460 (60% chlorinated terphenyl). Other halogenated polyphenyls are exemplified by decabromodiphenyl, hexabromoterphenyl, octabromotetraphenyl, hexafluoroterphenyl, and the like.

The preferred halogenated benzenes are hexachlorobenzene and tetrachlorobenzene although hexabromobenzene and hexafluorobenzene can also be used as well as lesser halogenated benzenes such as pentachlorobenzene, tetrabromobenzene, trifluorobenzene, and the like.

The complexity of the halogenated polyphenyl and phenol-formaldehyde-aniline resins can lead to mixtures of etheramines containing mono-, di-, tri- and tetra- and higher amines. However the nature of these etheramines can be controlled and by properly adjusting the reaction stoichiometry, any one etheramine can be produced predominantly and amine equivalencies can be reproducibly obtained having a single amine group or a plurality of two or more amine groups per etheramine molecule.

The haloaromatic etheramines of this invention are particularly useful in the preparation of imides by condensation with a dicarboxylic acid anhydride. This preparation is delineated in the equations below:

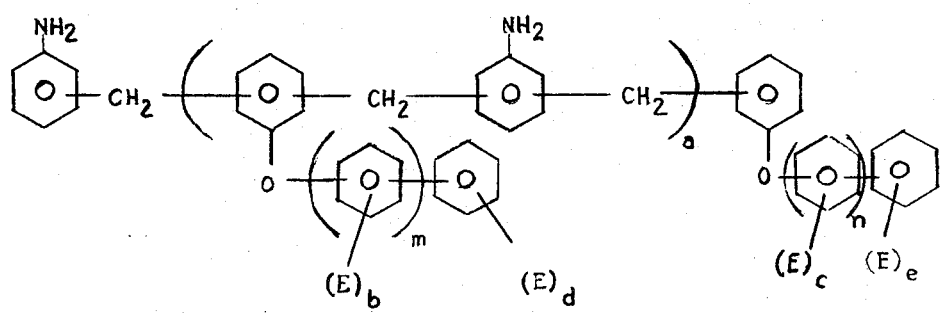
+ 2 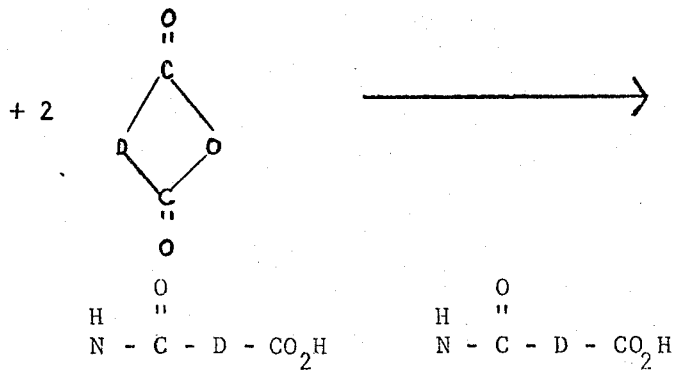
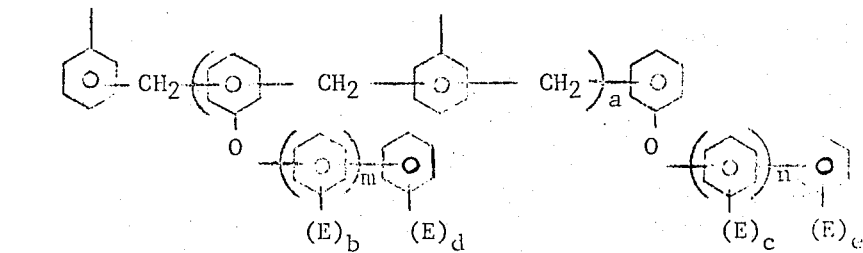
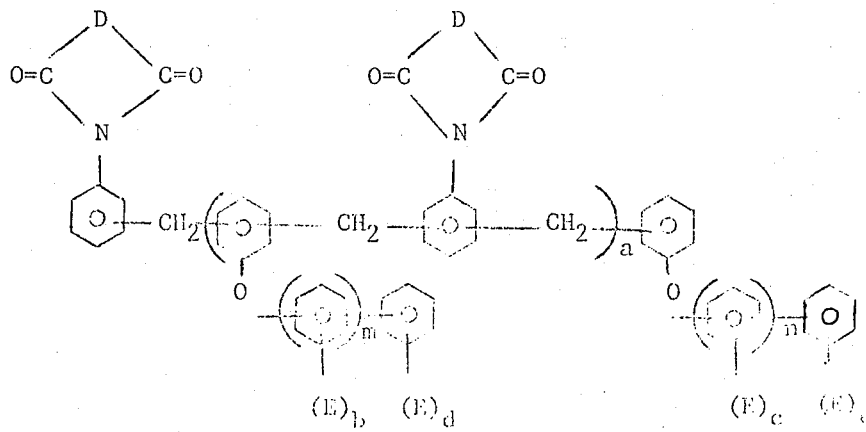
wherein $a$, $b$, $c$, $d$, $e$, $E$, $m$ and $n$ are as defined supra, and D is a divalent radical selected from the group consisting of
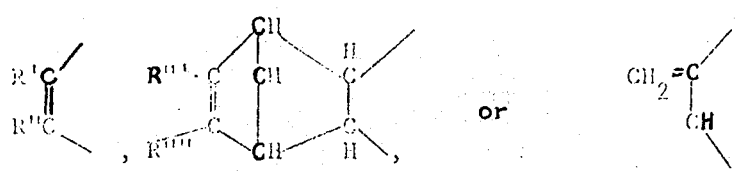
wherein each of R′, R″, R‴, and R⁗ is hydrogen, chlorine or a lower alkyl group having up to 8 carbon atoms.

Exemplary lower alkyl groups represented by R', R'', R''' and R'''' include methyl, ethyl, propyl, n-butyl, isobutyl, t-butyl, n-pentyl, n-hexyl, n-heptyl, n-octyl, and the like.

Preferred dicarboxylic acid anhydrides useful in this invention for the preparation of imides include maleic anhydride, dichloromaleic anhydride, 5-norbornene-2,3-dicarboxylic acid anhydride, 1-methyl-5-norbornene-2,3-dicarboxylic acid anhydride, 1,4,5,6,7,7-hexachloro-5-norbornene-2,3-dicarboxylic acid anhydride, Nadic anhydride (a trademark of the National Aniline Division of Allied Chemical Corp. for endo-cis-bicyclo[2.2.1] hept-5-ene-2,3-dicarboxylic acid anhydride), itaconic acid anhydride, citraconic acid anhydride and the like.

The resultant imides can be cured to a thermoset composition by heating to elevated temperatures, that is in the range of about 150° to about 260°C. These thermoset compositions do not display a heat distortion temperature and show a tensile modulus of about 220,000 psi at 300°C. Such properties qualify these compositions for use in the friction binder area.

The invention is further described in the examples which follow. All parts and percentages are by weight unless otherwise specified.

EXAMPLE 1

Synthesis of Phenol-Formaldehyde-Aniline Resin

An aqueous solution of formaldehyde (409.01 g.; 13.62 moles) was added to a vigorously stirred mixture of phenol (994.45 g.; 10.62 moles) and aniline (988.93 g.; 10.62 moles) contained in a three-neck, round-bottom reaction flask, equipped with a stirrer, thermometer and reflux condenser. The heterogeneous mixture was refluxed for 1 hour at 102°C. The flask was then equipped for distillation and the reactants slowly heated to 180°C. while a mixture of water and organic materials was permitted to distill at atmospheric pressure. The temperature was maintained at 175°–180°C. for 30 minutes. The pressure was then gradually reduced with further collection of distillate. After 10 minutes at 180°C. (pot temperature) and 3 mm pressure, distillation ceased. The pale orange residue was extremely viscous at 180°C. and upon cooling to room temperature it became a brittle glass.

A yield of 71% of phenol-formaldehyde-aniline resin was obtained. This product had an amine equivalent weight of 211 and a hydroxyl equivalent of 202.

The amine equivalent weight was determined by the colorimetric titration of the phenol-formaldehyde-aniline resin dissolved in acetic acid with a standard 0.1N solution of perchloric acid in acetic acid using crystal violet as the indicator (1% solution in acetic acid). The procedure is delineated in "Organic Functional Group Analysis" pg. 26 by F. E. Critchfield, The McMillan Co., N.Y.C., 1963. The results are reported as grams/NH$_2$.

The hydroxyl equivalent was determined by titration with 0.11N tetrabutylammonium hydroxide in benzene:methanol::10:1 (volume:volume). The end point was determined potentiometrically. In the specific test procedure used, samples of phenol-formaldehyde-aniline resins weighing about 0.15 grams were dissolved in methylene chloride for titration. The results are reported as grams/hydroxyl equivalent.

EXAMPLE 2

Synthesis of a Phenol-Formaldehyde-Aniline Resin-/Aroclor 5460 (1.0/0.9) Etheramine.

To a 5 liter, 4 neck flask, equipped with a thermometer, nitrogen purge, mechanical stirrer, condenser and Barrett tube was charged 303 g. of a phenol/formaldehyde/aniline resin having 1.5 hydroxyl equivalents prepared as in Example 1 from 1:1:1 moles of phenol, formaldehyde and aniline. To this was added 780 g. (1.35 moles) of Aroclor 5460 and 900 ml. of xylene. The resultant solution was purged with nitrogen and 1,100 ml. of dimethyl sulfoxide added. Heat was applied until the contents of the flask refluxed (155°C.) whereupon 121.7 g. (1.5 moles) of a 49.23% aqueous sodium hydroxide solution was added dropwise over a period of 1 hour.

Dehydration was completed in two hours and all of the xylene and 10% of the dimethyl sulfoxide was stripped off. The remaining reaction mixture was stirred for 1 hour at 165°C., cooled, filtered, and the phenol-formaldehyde-aniline resin/Aroclor 5460 preparation (1.0/0.9 moles) was isolated by coagulation in 10:1 ratio of water (containing 0.2% NaOH and 1% Na$_2$SO$_3$) to resin. The product resin showed an amine equivalent of 726 g./NH$_2$.

EXAMPLE 3

Synthesis of Phenol-Formaldehyde-Aniline Resin/Aroclor 5460 (1.0/0.8) Etheramine The procedure described in Example 2 as shown above was followed using 401.28 g. (1.92 equivalents) of PFAR (hydroxyl equivalent 209), 888.0 g. Aroclor 5460 (1.536 mole), 1000 ml xylene and 1300 ml dimethylsulfoxide. The PFAR/Aroclor 5460 resin prepared in this manner had a dried weight of 1213 g. and an amine equivalent weight of 656. The melting point was 112°–120°C.

EXAMPLE 4

Synthesis of a Phenol-Formaldehyde-Aniline Resin-/Aroclor 5460 (1.0/0.6) Etheramine The procedure described in Example 2 was followed using 150 g. of phenol-formaldehyde-aniline resin (having an hydroxy equivalent of 0.742) and 257.2 g. (0.445 moles) of Aroclor 5460. The phenol-formaldehyde-aniline resin/Aroclor 5460 resin preparation was obtained in a 97.4% yield having an amine equivalent of 536 g./NH$_2$.

EXAMPLE 5

Pilot Plant Preparation of Phenol-Formaldehyde-Aniline Rein/Aroclor 5460 Amine

A 35 gallon reactor equipped with a stirrer, thermocouple, nitrogen inlet, condenser and water/xylene separator was charged with:

23.92 lbs. PFAR (OH equivalent weight = 202 g.) (53.76 equivalents)
58.2 lbs. Aroclor 5460 (MW = 572) (45.70 moles)
53.6 lbs. Xylene (7.2 gallons)
92.3 lbs. Dimethylsulfoxide (10.4 gallons)

The reactor was sparged with nitrogen and heated to reflux. At reflux, 9.76 lbs. 48.5% sodium hydroxide solution (53.76 moles) was added over a one hour period while removing the water in the decanter separator. After completion of the sodium hydroxide solution, the system was dehydrated and the xylene was removed until the pot temperature reached 165°C. (this entire operation required 4 hours). Stirring was continued for one hour at 165°C. and the reactor was cooled to about room temperature before discharging.

The product was recovered by coagulation in a five-volume time excess of water containing 0.2% sodium hydroxide and 1.0% sodium sulfite. The filtered product was reslurried in a five weight time excess of water and filtered. This material was dried to a constant weight at 70°C. under vacuum.

The yield of product was 72.2 lbs. The amine equivalent weight was 696 g./NH$_2$.

EXAMPLE 6

Synthesis of Phenol-Formaldehyde-Aniline Resins/Hexachlorobenzene Etheramine

A 5 liter, 4 neck flask, equipped with a thermometer, nitrogen purge, mechanical stirrer, condenser and Barrett tube was charged with:

606 g. PFAR (hydroxyl equivalent weight = 202) (3.0 equivalents)
726 g. Hexachlorobenzene (MW 284.8) (2.55 mole)
800 ml. Xylene
1. liter Dimethylsulfoxide The mixture was sparged with nitrogen and heated to reflux. At reflux, 243.5 g. 49.23% sodium hydroxide solution (3.0 mole) was added over a one hour period while concurrently removing the water via the xylene-H$_2$O azeotrope.

Dehydration was completed in two hours and then followed by the removal of the xylene until the pot temperature reached 165°C. The solution was stirred for 1 hour at 165°C., cooled and the product isolated via coagulation in a 5:1 volume ratio of water containing 0.2% sodium hydroxide and 1% sodium sulfite. After slurrying the filter product in fresh water, the "diamine" was recovered by filtration and dried at 70°C. under vacuum.

The yield was 1148 grams. The amine equivalent weight was 443 g./NH$_2$; the m.p. was 96°-105°C.

EXAMPLE 7

Synthesis of Maleimide from a Phenol-Formaldehyde-Aniline Resin/Aroclor 5460 Etheramine To a 5 liter, 4 neck flask, equipped with a thermometer, nitrogen purge, mechanical stirrer, condenser and Barrett tube was charged 450 g. of phenol-formaldehyde-aniline resin (having an hydroxy equivalent of 1.96 g.) prepared as in Example 1, 567 g. of Aroclor 5460 (0.98 moles), 1,220 ml. of xylene and 1,000 ml. of N-methyl pyrrolidinone. The solution was purged with nitrogen, heated to reflux and 159.5 of a 49.23% aqueous sodium hydroxide solution added dropwise over a period of 1 hour.

After complete dehydration which took about 2 hours and removal of the xylene plus 10% of the N-methyl pyrrolidinone by stripping, the reaction mixture was stirred for 30 minutes at 160°C. and then cooled to 25°C.

Two hundred and twenty-six grams (2.3 moles) of maleic anhydride was added to the reaction mixture in small increments to control the exothermic reaction which resulted. After stirring for 1 hour at room temperature, 238.5 g. of acetic anhydride and 36.9 g. of sodium acetate were added. The mixture was stirred for an additional 2 hours at room temperature, filtered and the maleimide product isolated by coagulation of the reaction mixture in a ten time excess of water.

The thermosetting maleimide thus prepared was fabricated into plaques by compression molding at 200°C./500 psi for 30 minutes followed by a one hour post cure at 260°C. The cured material, so obtained, exhibited a glass transition temperature at 170°C., a room temperature sheer modulus of $1.25 \times 10^{10}$ dynes/cm$^2$ and a sheer modulus of $1.7 \times 10^9$ at 280°C. After further aging of the sample at 260°C., the room temperature sheer modulus was $1.4 \times 10^{10}$ dynes/cm$^2$ and the 280°C. sheer modulus was $6.5 \times 10^9$ dynes/cm$^2$; this aged sample did not exhibit a glass transition temperature.

EXAMPLE 8

Synthesis of Maleimide from Phenol-Formaldehyde-Aniline Resin/Aroclor 5460 Etheramine To a one liter, 4 neck flask was charged 130 g. (0.249 equivalent) of PFAR/Aroclor 5460 Etheramine (amine equivalent weight 523), 260 ml. dimethylacetamide and 24.4 g. (0.249 mole) of maleic anhydride. The reaction was maintained at approximately room temperature during the maleic anhydride addition. After one hour, 25.4 g. (0.249 mole) of acetic anhydride and 20.4 g. (0.249 mole) of sodium acetate was added and stirring continued for 4 hours. The resulting maleimide was recovered by coagulation from a ten fold excess of water and dried at 80°C. in a vacuum oven. The yield was 257 grams; melting point, 158°-170°C.

The above thermosetting maleimide had a gel time of 1 minute at 245°C. A compression molded plaque exhibited a glass transition temperature at 240°C. after curing for 1 hour at 280°C. The room temperature sheer modulus was $1.4 \times 10^{10}$ dynes/cm$^2$.

Although the invention has been described in its preferred form with a certain degree of particularity, it is understood that the present disclosure has been made only by way of example and that numerous changes can be made departing from the spirit and scope of the invention.

What is claimed is:

1. Haloaromatic imide represented by the formula:

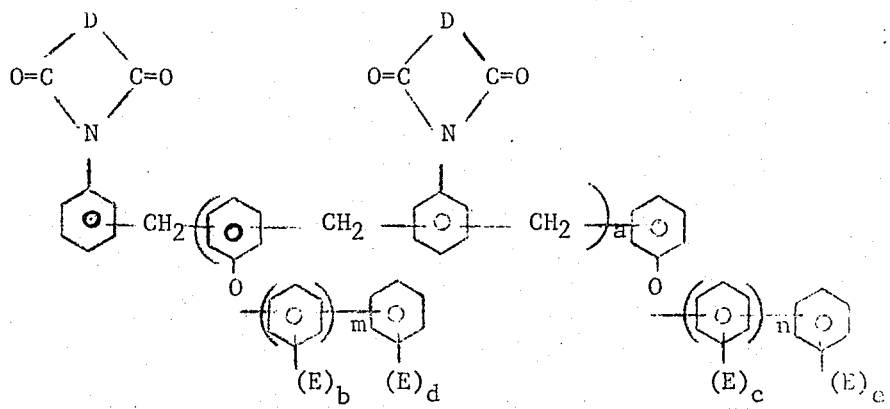

wherein
E is a halogen selected from the group consisting of fluorine, chlorine, and bromine;
$a$ is an integer having average values of 0 to 5;
$b$ and $c$ are each integers having values of 1 to 4;

$d$ and $e$ are each integers having values of 1 to 5;
$m$ and $n$ are each integers having values of 0 to 3; and
D is

wherein each of R' and R'' is a monovalent radical selected from the group consisting of hydrogen, chlorine and lower alkyl groups having up to 8 carbon atoms.

2. Imide claimed in claim 1 wherein E is chlorine.

3. Imide claimed in claim 2 wherein $m$ and $n$ each has a value of 2.

4. Imide claimed in claim 2 wherein $m$ and $n$ each has a value of 1.

5. Imide claimed in claim 2 wherein $m$ and $n$ each has a value of 0.

6. Imide claimed in claim 2 wherein each of R' and R'' is hydrogen.

7. Imide claimed in claim 2 wherein each of R' and R'' is methyl.

8. Imide claimed in claim 1 wherein each of R' and R'' is chlorine.

9. Imide claimed in claim 1 wherein $a$ has a value of 1.

* * * * *